United States Patent
Hofmeister et al.

(10) Patent No.: US 8,806,927 B2
(45) Date of Patent: Aug. 19, 2014

(54) METHOD FOR TESTING A PRESSURE SENSOR OF A FUEL ACCUMULATOR DEVICE

(75) Inventors: Carl-Eike Hofmeister, Regensburg (DE); Michael Käsbauer, Neutraubling (DE); Matthias Stampfer, Berching (DE)

(73) Assignee: Continental Automotive GmbH, Hannover (DE)

(*) Notice: Subject to any disclaimer, the term of this patent is extended or adjusted under 35 U.S.C. 154(b) by 715 days.

(21) Appl. No.: 12/993,993

(22) PCT Filed: Apr. 17, 2009

(86) PCT No.: PCT/EP2009/054580
§ 371 (c)(1),
(2), (4) Date: Nov. 22, 2010

(87) PCT Pub. No.: WO2009/141200
PCT Pub. Date: Nov. 26, 2009

(65) Prior Publication Data
US 2011/0077842 A1    Mar. 31, 2011

(30) Foreign Application Priority Data

May 23, 2008    (DE) .................... 10 2008 024 956

(51) Int. Cl.
*G01M 15/09*    (2006.01)
(52) U.S. Cl.
USPC ........................................... 73/114.43
(58) Field of Classification Search
CPC ....... G01L 23/18; G01L 23/222; G01L 23/10; G01L 27/007
USPC ............... 73/114.38, 114.43, 114.45, 114.51, 73/114.77
See application file for complete search history.

(56) References Cited

U.S. PATENT DOCUMENTS

| 4,483,294 A | 11/1984 | Sawamoto ..................... 123/417 |
| 6,012,438 A | 1/2000 | Joos et al. ..................... 123/690 |
| 7,278,405 B2* | 10/2007 | Takahashi ..................... 123/514 |
| 7,677,092 B2* | 3/2010 | Ishizuka et al. ............ 73/114.45 |
| 7,810,472 B2* | 10/2010 | Kondo et al. ................ 123/456 |

(Continued)

FOREIGN PATENT DOCUMENTS

| DE | 19721176 A1 | 12/1998 | ............. F02M 65/00 |
| DE | 19834660 A1 | 2/2000 | ............. F02D 41/22 |

(Continued)

OTHER PUBLICATIONS

International PCT Search Report and Written Opinion, PCT/EP2009/054580, 13 pages, Jul. 23, 2009.

(Continued)

*Primary Examiner* — Eric S McCall
(74) *Attorney, Agent, or Firm* — King & Spalding L.L.P.

(57) ABSTRACT

In a method for testing a pressure sensor of a fuel accumulator device in an internal combustion engine, the pressure in the fuel accumulator device is altered using a first actuating variable. The influence of that alteration on the torque generated by the internal combustion engine is determined by a closed loop control system adjusting a second actuating variable to counteract the effect of the first on the torque output by the internal combustion engine. A deviation of the measured alteration from the expected alteration is then calculated.

18 Claims, 5 Drawing Sheets

(56) References Cited

U.S. PATENT DOCUMENTS

| | | | |
|---|---|---|---|
| 7,963,155 B2 * | 6/2011 | Kondo et al. | 73/114.43 |
| 2002/0112528 A1 | 8/2002 | Antonioli et al. | 73/49.7 |
| 2004/0149253 A1 * | 8/2004 | Kikuchi et al. | 123/295 |
| 2007/0193558 A1 * | 8/2007 | Achleitner et al. | 123/447 |
| 2007/0204674 A1 | 9/2007 | Takaku | 73/35.02 |
| 2009/0063013 A1 * | 3/2009 | Nakata et al. | 701/103 |
| 2009/0107225 A1 * | 4/2009 | Ishizuka et al. | 73/114.15 |
| 2009/0107227 A1 * | 4/2009 | Ishizuka et al. | 73/114.74 |
| 2009/0288638 A1 * | 11/2009 | Dintino et al. | 123/447 |
| 2010/0229831 A1 * | 9/2010 | Hernier et al. | 123/447 |

FOREIGN PATENT DOCUMENTS

| | | | | |
|---|---|---|---|---|
| DE | 10036153 A1 | 2/2002 | | F02D 41/30 |
| DE | 10205377 A1 | 8/2003 | | F02D 41/22 |
| DE | 102004055313 A1 | 5/2006 | | F02D 41/00 |
| DE | 60117090 T2 | 11/2006 | | F02D 41/38 |
| DE | 102005035092 A1 | 2/2007 | | G01L 27/00 |
| DE | 102007000152 A1 | 9/2007 | | F02D 41/22 |
| DE | 102007015876 A1 | 12/2007 | | F02D 41/22 |
| EP | 1371836 A2 | 12/2003 | | F02D 41/06 |
| EP | 1418327 A2 | 5/2004 | | F02D 41/14 |
| WO | 01/02720 A1 | 1/2001 | | F02M 65/00 |

OTHER PUBLICATIONS

German Office Action, German Patent Application No. 10 2008 024 956.4-26, 4 pages, Feb. 16, 2009.

* cited by examiner

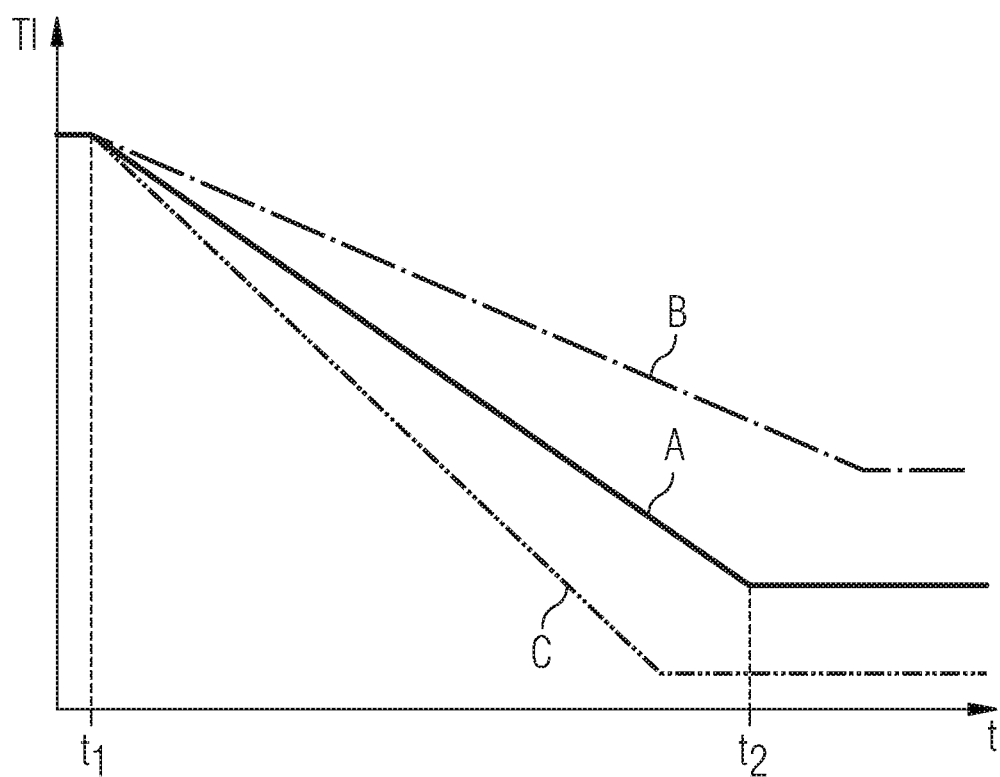

METHOD FOR TESTING A PRESSURE SENSOR OF A FUEL ACCUMULATOR DEVICE

CROSS-REFERENCE TO RELATED APPLICATIONS

This application is a U.S. National Stage Application of International Application No. PCT/EP2009/054580 filed Apr. 17, 2009, which designates the United States of America, and claims priority to German Application No. 10 2008 024 956.4 filed May 23, 2008, the contents of which are hereby incorporated by reference in their entirety.

TECHNICAL FIELD

The invention relates to a method for testing a pressure sensor of a fuel accumulator device in an internal combustion engine.

BACKGROUND

Methods and apparatuses for apportioning fuel to an internal combustion engine are known from the prior art, in which the fuel is delivered pressurized into a fuel accumulator device by means of a pump. Injectors, which are assigned to the respective cylinders of the internal combustion engine, extract fuel from the fuel accumulator device and apportion it at predeterminable points in time in a predeterminable quantity to the respective cylinder of the internal combustion engine. The apportioned quantity of fuel can be adjusted here to different operating states by way of the opening time of the injector, the number of individual injections and the fuel pressure in the fuel accumulator device.

The fuel pressure in the fuel accumulator device can be regulated to a desired value, which is dependent on the operating state, by means of a control device. A pressure sensor is provided here in order to detect the actual value. If the measured actual value is lower than the provided desired value, the actual value can be increased by actuating the fuel pump.

If the actual value is higher than the target desired value, a controllable return valve allows for the decrease in pressure.

If the fuel pressure in the fuel accumulator device is incorrectly set as a result of the control loop, the fuel quantity fed to the combustion process changes in an unwanted fashion. This mostly results in unwanted behavior of the internal combustion engine and of the motor vehicle equipped therewith, like for instance loss of power, increase of power, irregular engine operation, poor emission values, high consumption or suchlike. Since the internal combustion engine in a motor vehicle is operated with frequently changing operating conditions, it is not possible for an on-board diagnosis system, which is integrated in the engine control device, to determine the precise cause of fault of the injection system. Possible causes of fault are for instance the return valve, the fuel pump, the injectors or the pressure sensor. This frequently results in undamaged components being replaced. Such a replacement is always associated with time and effort and costs, without the motor vehicle subsequently functioning properly again. Customer satisfaction is herewith negatively influenced.

SUMMARY

According to various embodiments, an electrical fault-free, but nevertheless incorrectly indicating pressure sensor can be identified in a fuel accumulator device of an internal combustion engine by means of a simple testing method.

According to an embodiment, in a method for testing a pressure sensor of a fuel accumulator device of an internal combustion engine, in which the pressure in the fuel accumulator device changes, the influence of the change on the torque generated by the internal combustion engine is determined, with a deviation in the measured change from the expected change being determined.

According to a further embodiment, the torque generated by the internal combustion engine can be determined by means of a torque detection facility. According to a further embodiment, the pressure in the fuel accumulator device changes and the torque generated by the internal combustion engine may be kept constant by changing at last one further actuating variable, with a deviation in the implemented change in the at least one further actuating variable from the expected changed in the at least one further actuating variable being determined. According to a further embodiment, the at least one further actuating variable can be selected from an injection duration and/or an injection time and/or an ignition time and/or a throttle valve position. According to a further embodiment, the actual value of the at least one further actuating variable can be determined by a control loop such that the control variable remains constant. According to a further embodiment, the control variable can be selected from a speed and/or a cylinder pressure. According to a further embodiment, the pressure in the fuel accumulator device can be changed continuously, in particularly linearly. According to a further embodiment, the method flow can be controlled by a diagnostic device, which is connected to an engine control device by means of an interface. According to a further embodiment, the desired value of the pressure in the fuel accumulator device and/or an engine speed and/or a cylinder pressure can be predetermined by the diagnostic device. According to a further embodiment, a deviation in the implemented change in the at least one further actuating variable from the expected change in the at least one further actuating variable can be determined by the diagnostic device. According to a further embodiment, the speed of the internal combustion engine may amount to between 2000 l/min and 3500 l/min.

According to another embodiment, the method as described above can be used for testing the rail pressure sensor of a self-igniting internal combustion engine with direct fuel injection.

According to yet another embodiment, a computer program may implement a method as described above, if the computer program is executed on a computer.

According to a further embodiment of the computer program, the computer program may have a program code, which is stored on a machine-readable data carrier, for implementing a method as described above, if the computer program is executed on a computer. According to a further embodiment of the computer program, the machine-readable data carrier may include a semiconductor memory, in particular a ROM and/or a PROM and/or an EPROM and/or an EEPROM and/or Flash EPROM.

BRIEF DESCRIPTION OF THE DRAWINGS

The invention is to be explained in more detail below with the aid of Figures and an exemplary embodiment without restricting the general inventive idea, in which;

FIG. 6 shows the temporal course of the opening duration TI of an injector.

DETAILED DESCRIPTION

Figure 1:
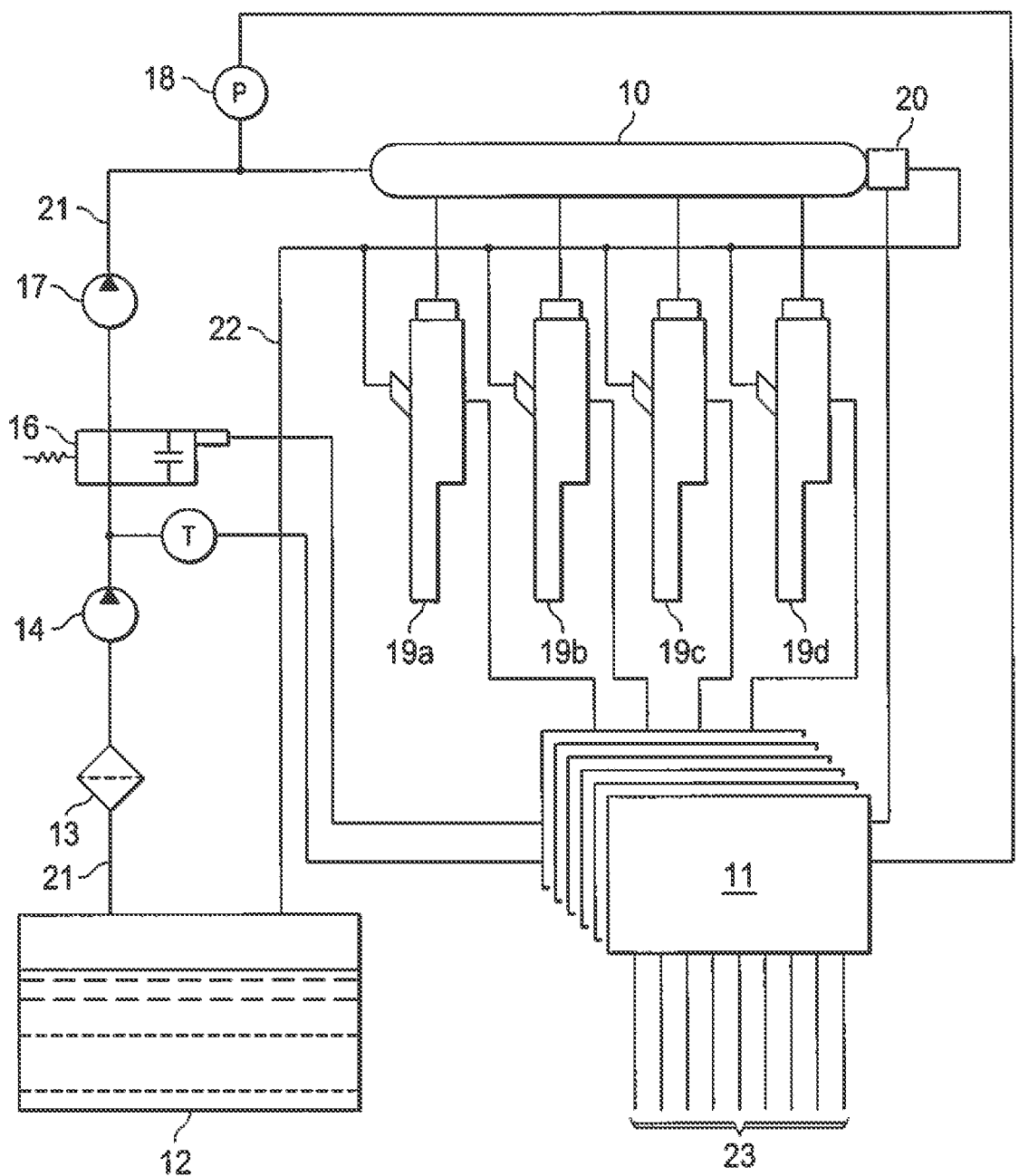
FIG. 1 shows a schematic representation of the fuel apportionment to an internal combustion engine.

The object is achieved by a method for testing a pressure sensor in a fuel accumulator device of an internal combustion engine, in which the pressure in the fuel accumulator device changes and the influence of the change on the torque generated by the internal combustion engine is determined, with a deviation in the measured change from the expected change being determined.

According to an embodiment, in a method for testing a pressure sensor of a fuel accumulator device of an internal combustion engine, in which the pressure in the fuel accumulator device changes and the torque generated by the internal combustion engine is kept constant by changing at least one further actuating variable, a deviation in the implemented change of the at least one further actuating variable from the expected change in the at least one further actuating variable is determined.

The proposed testing method is based on the fact that the torque produced is clearly correlated with the apportioned fuel quantity in a predetermined operating state. The fuel quantity is in this case a function of the pressure in the fuel accumulator device and the opening time and opening duration of the injector. If the pressure within the fuel accumulator device is increased, for instance by actuating a bypass valve, by actuating the delivery pump or by actuating a fuelling device, the fuel quantity and thus the produced torque will increase without corresponding counter measures. If the motor vehicle is equipped with a facility for detecting the torque, the change in torque resulting from the change in pressure can be determined immediately. An expected change in torque can be calculated from the measured value of the rail pressure and the remaining engine parameters. A deviation in the measured and the calculated torque herewith indicates a faulty rail pressure sensor.

According to an embodiment, it is proposed to compensate for the increase in torque when increasing the rail pressure by intervention in at least one further actuating variable of the internal combustion engine. This intervention actually needed is then compared with an intervention which is determined in a theoretical model of the internal combustion engine. If the actually needed intervention is greater than expected, the pressure in the fuel accumulator device is higher than that predetermined by the pressure sensor. If the necessary intervention is less than theoretically expected, the pressure within the fuel accumulator device is lower than that indicated by the pressure sensor.

The injection duration, i.e. the opening time of the injector, is particularly suitable as an actuating variable, which counteracts the change in torque during a change in the fuel pressure. As a result, the injected quantity of fuel and the torque produced by the internal combustion engine is kept constant. At the same time, the opening time of the injector can be measured in a particularly simple fashion with the aid of the actuation signal of the injector and the evaluation of the method is simplified.

The various embodiments nevertheless do not teach the change in injection duration as the principle of invention. Instead, a change in torque by changing the fuel pressure can also be compensated by other actuating variables, for instance by the injection time, the ignition time, the throttle valve position, the number of individual injections, the charging pressure or other parameters not mentioned here. The person skilled will instead select one or several suitable parameters as a function of the respective application purpose.

The actuating variable, which counteracts the increasing fuel pressure in the fuel accumulator device, is influenced in one embodiment by means of a control loop, such that the torque produced by the internal combustion engine is kept constant. The produced torque can be determined here for instance by means of a power absorption roller directly on the crankshaft or on the drive axle. In a further embodiment, the engine torque can be determined by one or several cylinder pressure sensors.

The implementation of the method in an engine idling situation is particularly simple and thus preferred. In this case, a constant speed of the internal combustion engine is adjusted in the case of a specific, predetermined quantity of fuel per power cycle, said constant speed being defined by the frictional losses inside the engine and external torque consumers such as for instance air-conditioning compressors, servo pumps, generators or gear parts. A quantity of fuel which increases as a result of an increase in fuel pressure produces an increased torque, which manifests itself in an increasing speed. The at least one selected actuating variable can then be used to reduce the torque until the previously prevailing speed is achieved again. To this end, the engine idling regulator of the engine control device can be used preferably but not imperatively.

In an embodiment, a speed is selected in order to implement the method, which is above the engine idling speed typically used during operation of the motor vehicle. In particular, the person skilled in the art will take into account a speed between 2000 l/min and 3500 l/min, if the internal combustion engine to be tested is a self-igniting internal combustion engine. With an externally ignited internal combustion engine, the person skilled in the art can if necessary also provide higher speeds, for instance 5000 l/min. This herewith ensures that the available torque is sufficient to supply the fuel pump with sufficient driving power so that the overall pressure range of the fuel accumulator device, which is produced during operation, can be passed through.

During normal operation of the internal combustion engine, the fuel pressure in the fuel accumulator device would remain constant during the constant operating state prevailing in the testing phase. Contrary thereto, the test routine nevertheless provides to vary the fuel pressure. The overall permissible operating range is preferably passed through here. Preferably, but not imperatively, a linear increase in the fuel pressure with the time is predetermined by the test routine. As a result, measured values recorded in a time-dependent fashion can be converted particularly easily into fuel pressure-dependent values.

The overall test method can either be implemented in a control device or in a diagnostic device, which is connected in the garage to the engine control device by means of a serial or parallel interface in order to implement the method. In the latter case, the proposed test routine disables parts of the engine control device during the test run. As a result, preselected desired values which deviate from the normal operation for instance can be predetermined for the fuel pressure or the speed for instance. Furthermore, the diagnostic device can visualize measured values of the actuating variables selected for compensation and compare these with the values expected during normal operation of the internal combustion engine.

FIG. 1 shows a schematic representation of the fuel apportionment to an internal combustion engine. The fuel is conveyed here in a storage tank 12 in the motor vehicle. From there, the fuel is ingested by means of a supply line 21 via a fuel filter 13 through a low pressure pump 14. The quantity apportioned to the internal combustion engine in the respective operating state can be influenced by the engine electronics 11 by means of an adjustment valve 16. The quantity leaving the adjustment valve 16 is compressed by a high pressure pump 17 and fed to a fuel accumulator device 10. A pressure measuring facility 18 is available in order to measure the pressure prevailing in the fuel accumulator device 10. The desired value of the pressure is defined here by the engine control device 11 as a function of the operating state. If the pressure determined using sensor 18 is lower than the desired value, additional fuel is fed to the storage device 10 by way of a volume adjuster 16 and a high pressure pump 17, in order to increase the pressure. If the pressure determined using sensor 18 is higher than the required desired value, fuel can be discharged into a return line 22 by means of the valve 20.

During operation of the internal combustion engine, a quantity of fuel is taken from the storage device 10 by way of an injector 19 and fed to the combustion chamber of the internal combustion engine. FIG. 1 shows four injectors 19a, 19b, 19c and 19d of a four cylinder internal combustion engine. The desired values for the opening duration and the opening time are determined here by the control device 11 as a function of the operating state, i.e. as a function of the desired torque. According to the specific desired values, the injectors 19 are then actuated by the engine control device 11. Here the apportioned quantity of fuel is determined per work cycle by the opening duration and the pressure in the fuel storage device 10.

Furthermore, the control device 11 includes test and diagnosis routines, in order to determine faults on the cited components during operation of the internal combustion engine or during its start-up. It is however often not possible here to clearly assign a fault in the apportioned quantity of fuel to an injector 19, the high pressure pump 17, the fueling device 16, the pressure sensor 18 or the discharge valve 20. Only a short circuit in the connecting lines can be clearly identified by the control device 11. In the event of a fault, fully functional components are therefore often replaced by mistake.

Figure 2:
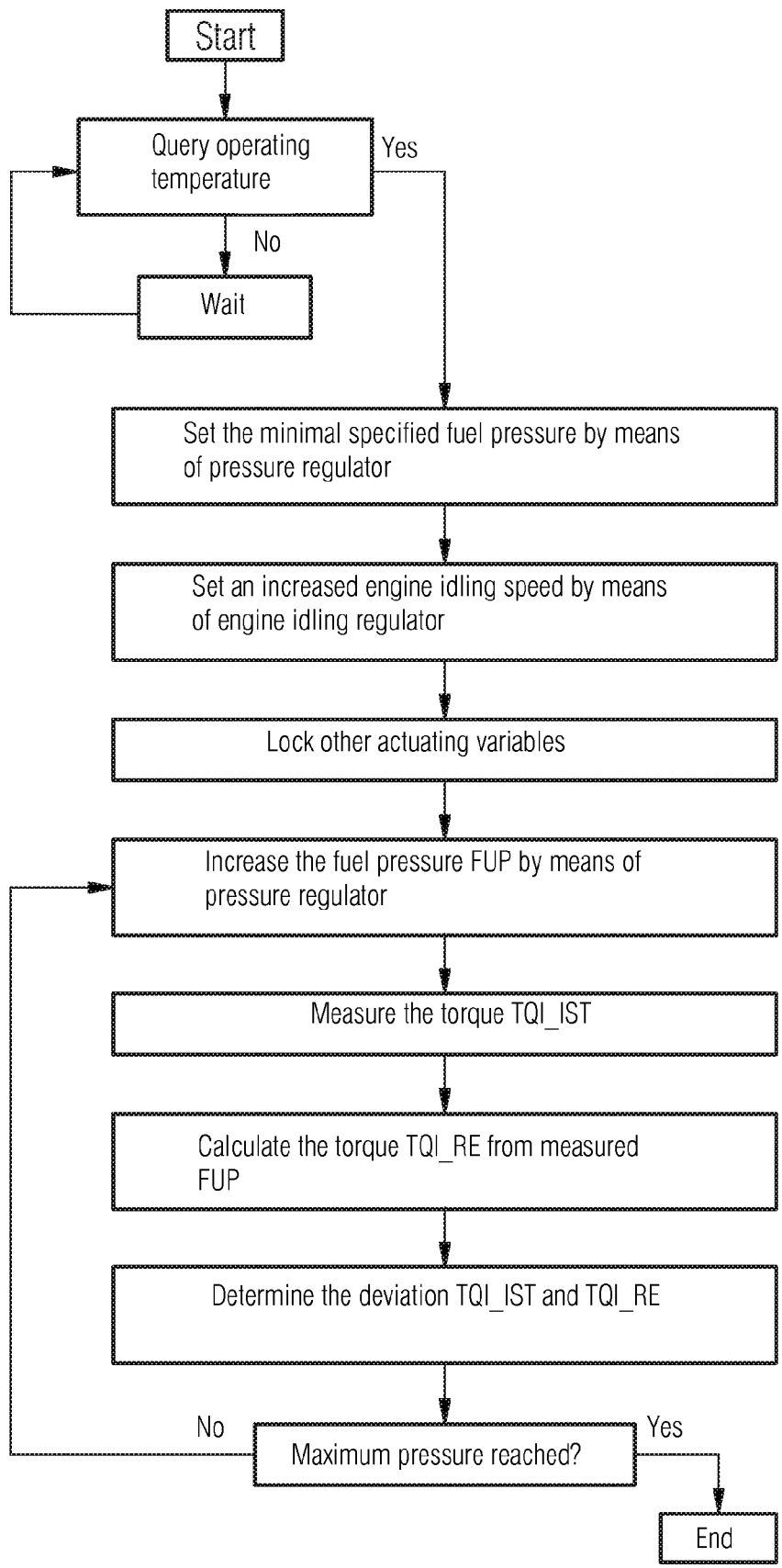
FIG. 2 shows a flow chart of an embodiment of a test routine, with which the function of the pressure sensor can be tested.

FIG. 2 describes an embodiment of a test routine, with which the function of the pressure sensor 18 can be tested. The test routine can be implemented here in the engine control device 11. Alternatively, the test routine can also run in a diagnostic device, which is connected to the control device 11 by means of the interface 23. Furthermore, provision can be made by the person skilled to allow some subfunctions to run in the engine control device 11 and other subfunctions in the diagnostic device.

The testing method relates to a measurement of the torque produced by the internal combustion engine. This results from the torque generated by the internal combustion engine less the internal torque losses. To keep the internal torque losses constant, the internal combustion engine should, as far as possible, have reached a constant operating temperature before the next method step is executed.

At the start of the actual measurement, a predetermined fuel pressure is set by the pressure regulator 18, the high pressure pump 17, the fueling device 16 and the discharge valve 20. In the exemplary embodiment, the method begins with the minimal specified fuel pressure. A person skilled in the art is however naturally able to begin the method with the highest specified pressure or with any interim value.

At the start of the method according to various embodiments, an increased engine idling speed is specified. For instance, the specification of an increased desired value can take place by means of the diagnostic device. The subsequent regulation of the internal combustion engine to this desired value can be executed by the engine idling regulator which is already available in the control device 11. The engine idling speed results here as a speed of equilibrium, with which the torque generated in the internal combustion engine compensates for both the frictional losses inside the engine and also the external torque consumers, like for instance servo pumps, compressors or generators.

This torque is measured by means of a torque detection facility. For instance, the torque can be determined on the crankshaft or on the drive axle.

Subsequent to these preparation steps, the actual testing of the pressure sensor 18 takes place. To this end, the fuel pressure FUP is changed in defined steps. The flow chart shows a method control, in which the fuel pressure FUP is gradually increased starting from a minimal specified pressure to the maximum pressure. In order to increase the fuel pressure FUP, the test routine can prespecify a new, increased desired value, which is set by the pressure regulator integrated in the engine control device 11. This increase in fuel pressure results in an increase in the fuel apportionment and thus in an increase in the torque.

In order to be able to reliably assess the change in the torque, all actuating variables are advantageously locked, which can influence the torque of the internal combustion engine. This thus ensures that a change in the measured torque exclusively takes place by changing the fuel pressure.

After adjusting the fuel pressure FUP, an expected value is determined for the torque TQI_RE, in the case of the fuel pressure FUP measured by means of the sensor 18, by means of a behavior model of the internal combustion engine. A deviation can then be determined between the calculated torque TQI_RE and the measured torque TQI_IST. If the deviation lies above a predetermined threshold value, it can be assumed that the pressure FUP measured by means of the pressure sensor 18 is not the pressure actually prevailing in the fuel accumulator device 10.

If the maximum pressure is still not reached, the last method steps are repeated. The fuel pressure FUP is thus increased further by prespecifying a higher desired value. A further measurement of the torque TQI_IST then takes place. A further value TQI_RE can be calculated for the torque from the newly measured fuel pressure FUP and the behavior model of the internal combustion engine. To complete the iteration, a deviation is in turn calculated between the measured torque TQI_IST and the calculated torque TQI_RE. A characteristic curve of the used pressure regulator 18 can be recorded in this way.

The characteristic curve allows a distinction to be made for instance to determine whether the pressure sensor 18 has a percental fault, which depends on the measured value or a constant offset. On the basis of the extent of the deviations, it is possible to decide whether the pressure sensor 18 is defective or is to be replaced. An unnecessary replacement of other components, like for instance a high pressure pump 17, the fuelling device 16 or the overpressure valve 20, can be prevented in this way.

Figure 3:
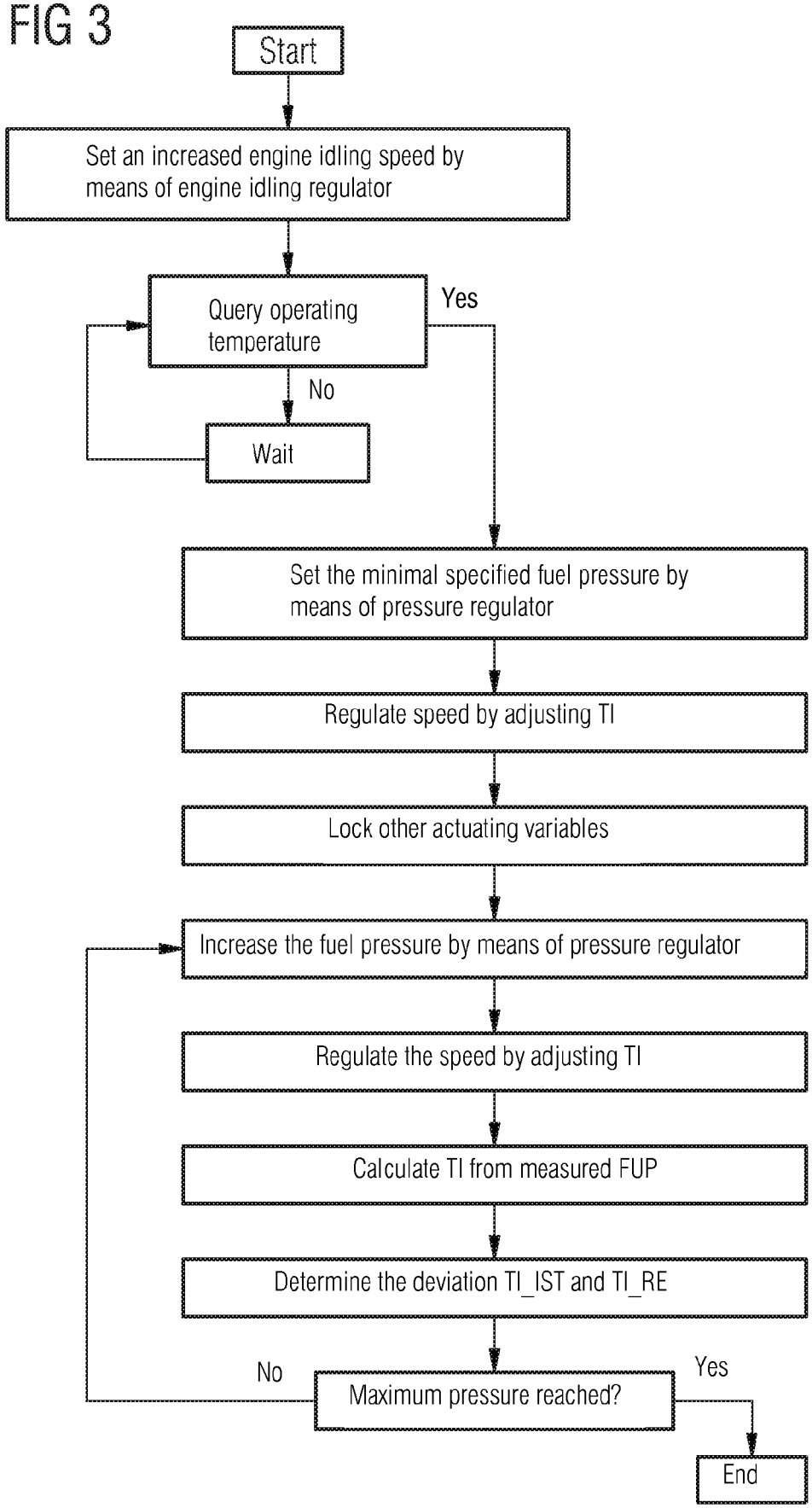
FIG. 3 shows a flow chart of a further embodiment of a test routine, with which the function of the pressure sensor can be tested.

FIG. 3 describes a further embodiment of a test routine, with which the function of the pressure sensor 18 can be tested. The test routine can be implemented here in the engine control device 11. Alternatively, the test routine can also run in a diagnostic device, which is connected to the control device 11 by means of the interface 23. Furthermore, the person skilled in the art can provide for some subfunctions to be able to run in the engine control device 11 and other subfunctions in the diagnostic device.

At the start of the method according to various embodiments, an increased engine idling speed is prespecified. For instance, the prespecification of an increased desired value can take place by means of the diagnostic device. The subsequent regulation of the internal combustion engine to this desired value can be implemented by the engine idling regulator, which is already present in the control device 11. The engine idling speed results here as a speed of equilibrium, with which the torque generated in the internal combustion engine compensates for both the frictional losses inside the engine and also the external torque consumers, like for instance servo pumps or generators. To ensure that the torque produced by the internal combustion engine clearly correlates with its speed, both the internal losses and also the external torque consumers are to remain as constant as possible. A connection of further torque consumers is therefore prevented. In order to keep the internal losses constant, the internal combustion engine should, as far as possible, have achieved a constant operating temperature before the next method step is implemented.

At the start of the actual measurement, a predetermined fuel pressure is set by the pressure regulator 18, the high pressure pump 17, the fueling device 16 and the discharge valve 20. In the exemplary embodiment, the method starts with the minimal specified fuel pressure. The person skilled in the art is naturally also able to begin the method with the highest specified pressure or with any interim value.

In the case of otherwise unchanged actuating variables, the change in fuel pressure results in a change in the apportioned quantity of fuel and thus in a changed torque, which can be noticed in a changed engine speed. At least one actuating variable is therefore influenced by the engine idling regulator in order to adjust the speed of the internal combustion engine back to the starting value. The exemplary embodiment shown here is the opening duration TI of the injectors 19. By adjusting the opening duration TI, the fuel quantity fed to the combustion chambers also remains constant during a change in the fuel pressure.

To be able to reliably assess the change in the selected actuating variables, here the opening duration TI, other actuating variables, which can influence the torque of the internal combustion engine, are advantageously locked. This ensures that a change in the fuel pressure is exclusively compensated by the selected actuating variable.

The actual testing of the pressure sensor 18 takes place after these preparation steps. To this end, the fuel pressure FUP is changed in defined steps. The flow chart shows a method control, in which the fuel pressure FUP is gradually increased from a minimal specified pressure to a maximum pressure. In order to increase the fuel pressure FUP, the test routine can specify a new, increased desired value, which is set by the pressure regulator integrated in the engine control device 11.

This increase in fuel pressure results in an increased fuel apportionment and thus in an increase in the torque. In the case of a constant load of the internal combustion engine, the increase in the torque results in an increased speed. The opening duration of the injectors TI is therefore influenced by way of the engine idling regulator until the originally selected speed is reproduced again.

Subsequent to the adjustment of the fuel pressure FUP, opening time TI and speed, in the case of the fuel pressure FUP measured by means of sensor 18, an expected value is determined for the opening duration TI by means of a behavior model of the internal combustion engine. A deviation between the calculated opening duration TI_RE and the measured opening duration TI_IST can then be determined. If the deviation lies above a predetermined threshold value, it can be assumed that the pressure FUP measured by means of the pressure sensor 18 is not the pressure which actually prevails in the fuel accumulator device 10.

If the maximum pressure is still not reached, the last method steps are repeated. The fuel pressure FUP is therefore increased further by specifying a higher desired value. The adjustment of the speed and thus of the torque again takes place by adjusting the opening duration TI of the injectors. A further value TI_RE can be calculated for the opening duration from the newly measured fuel pressure FUP and the behavior model of the internal combustion engine. To complete the iteration, a deviation between the set opening duration TI_IST determined by the engine idling regulator and the calculated opening duration TI_RE is calculated again. In this way, a characteristic curve of the used pressure regulator 18 can be recorded.

The characteristic curve enables for instance the distinction to be made as to whether the pressure sensor 18 has a percental error, which depends on the measured value or a constant offset. As a result of the extent of the deviations, it is possible to decide whether the pressure sensor 18 is defective and is to be replaced. In this way, an unnecessary replacement of other components, like for instance the high pressure pump 17, the fueling device 16 or the overpressure valve 20, can be prevented.

Figure 4:
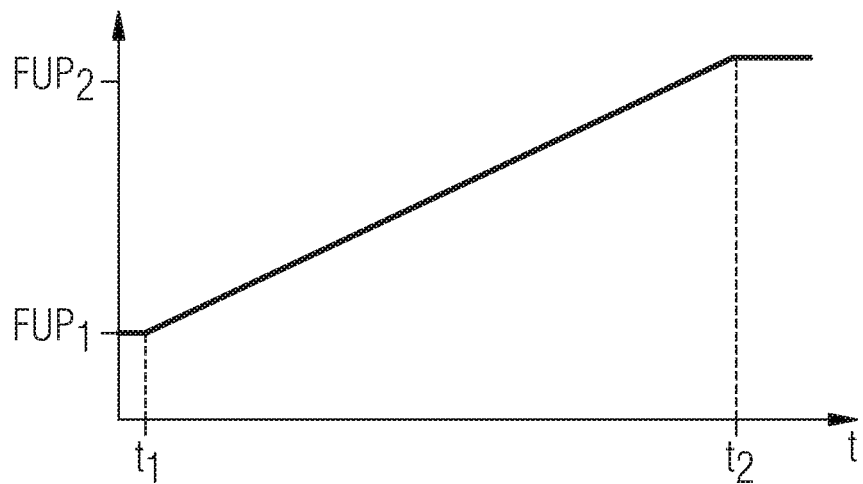
FIG. 4 shows the fuel pressure FUP against time for the exemplary embodiments described in FIGS. 2 and 3.

FIG. 4 once again shows the fuel pressure FUP against the time for the exemplary embodiment described with the aid of FIG. 3. The method begins at the lowest specified value $FUP_1$. With each iteration, an enlargement of the pressure takes place by a constant value, so that a linear increase results over time up to the highest specified value $FUP_2$ with a similar method duration for each iteration step. It should be noted that the linear curve shown in FIG. 4 is only exemplary. The person skilled in the art can naturally provide other curve courses.

Figure 5:
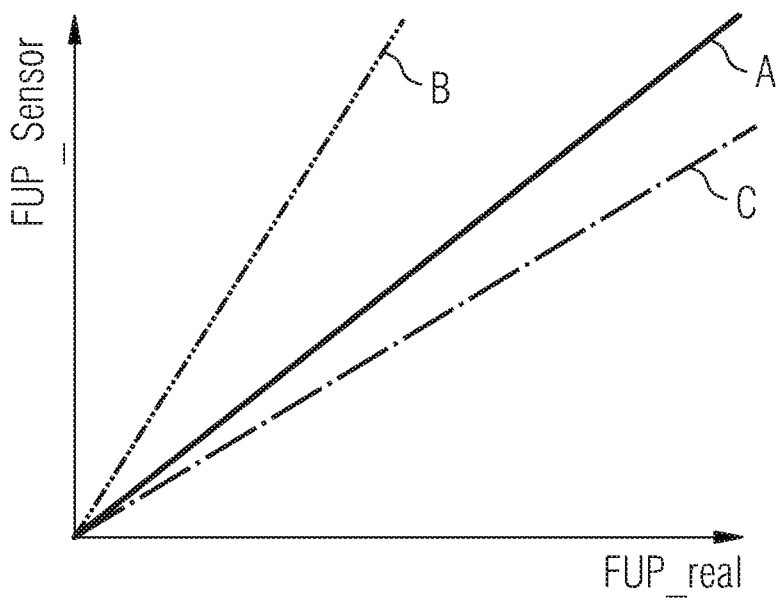
FIG. 5 shows possible faults in the pressure sensor.

FIG. 5 shows possible errors in the pressure sensor 18. The real pressure FUP_REAL prevailing in the storage device 10 is shown on the x-axis and the indicated measured value FUP_SENSOR is shown on the y-axis. If the pressure sensor 18 is functioning correctly, the curve shown in curve A results. Curve A is a straight line, which is inclined at 45° to both axes. This means that the measured fuel pressure corresponds to the real prevailing pressure within the scope of the measuring accuracy. Furthermore, possible fault curves are shown in curve B and C. In the case of curve B, the fuel sensor 18 shows a lower value than the actually prevailing pressure. In the case of curve C, which is shown by way of example, the pressure sensor indicates a higher value than the actually prevailing pressure. Both cases involve a percental fault, which increases with increasing pressure. Curves B and C are to be understood as purely exemplary. Non-linear curves or constant error values, which are to be added to the respective prevailing pressure would also be conceivable.

During operation of the internal combustion engine, the opening duration TI of the injectors 19 is set by the control device 11 with the aid of the measured fuel pressure FUP_SENSOR. If the measured fuel pressure deviates as shown in FIG. 5, this results in an incorrect quantity of fuel.

FIG. 6 shows the temporal course of the opening duration TI of an injector 19 during the method according to various embodiments, if the fuel pressure FUP has the temporal course shown in FIG. 4. Here Figure A represents the expected curve course of an internal combustion engine, the pressure sensor 18 of which is undamaged. The curve courses B and C then always result if the pressure sensor 18 has the damage shown in FIG. 5.

With the increase in pressure shown in FIG. 4, the injection duration TI is shortened by the engine idling regulator. In this way, the increasing fuel pressure is compensated and the apportioned quantity of fuel and thus the indicated torque of the internal combustion engine remain constant. It should be noted that the linear course shown by way of example in Figure as A does not necessarily have to correspond to the real conditions. As a function of the geometry of the injection nozzles and the operating state of the internal combustion engine, a non-linear course can also arise.

If the pressure sensor 18 does not indicate the real prevailing fuel pressure but instead a higher fuel pressure, the course of the opening time shown in curve B is adjusted. In curve B, the actual opening time TI of an injector is greater than the opening time actually expected with the measured fuel pressure. A clearer indication results therefrom such that the actual pressure has to be lower than that predetermined by the pressure sensor 18.

If the pressure sensor 18 indicates a lower pressure than is actually present in the storage device 10, the course of the opening time shown in curve C results. It is apparent herefrom that in order to achieve a constant torque, i.e. for a constant injection quantity, a shorter injection duration is needed than according to the pressure measurement with sensor 18. In this case, the actual pressure is somewhere higher than that specified by the sensor 18.

What is claimed is:

1. A method for testing a pressure sensor of a fuel accumulator device of an internal combustion engine during operation of the internal combustion engine, the method comprising:
   implementing a change in a first actuating variable;
   applying a closed loop control scheme to vary a second actuating variable in response to the change in the first actuating variable, thereby maintaining a constant torque output by the internal combustion engine;
   comparing an actual change of the second actuating variable resulting from the closed loop control scheme to an expected change in the second actuating variable according to the closed loop control scheme, based on the implemented change in the first actuating variable, to determine a deviation between the actual change and the expected change; and
   evaluating an operating condition of the pressure sensor based on the determined deviation.

2. The method according to claim 1, wherein the second actuating variable is selected from at least one of: an injection duration, an injection time, an ignition time, and a throttle valve position.

3. The method according to claim 1, wherein the speed of the internal combustion engine amounts to between 2000 rpm and 3500 rpm.

4. The method according to claim 1, wherein the method is used for testing a rail pressure sensor of a self-igniting internal combustion engine with direct fuel injection.

5. The method according to claim 1, wherein the first actuating variable comprises a pressure in the fuel accumulator device.

6. The method according to claim 5, wherein the pressure in the fuel accumulator device is changed linearly.

7. The method according to claim 1, wherein the implementation of the method steps is executed by a diagnostic device, which is connected to an engine control device by means of an interface.

8. The method according to claim 7, wherein an expected value of at least one of the pressure in the fuel accumulator device, an engine speed, and a cylinder pressure is predetermined by the diagnostic device.

9. The method according to claim 7, wherein the deviation between the actual change and the expected change in the second actuating variable is determined by the diagnostic device.

10. A computer program product comprising a non-transitory machine-readable data carrier storing computer instructions which when executed on a computer perform a method for testing a pressure sensor of a fuel accumulator device of an internal combustion engine including the steps of:
    implementing a change in a first actuating variable;
    applying a closed loop control scheme to vary a second actuating variable in response to the change in the first actuating variable, thereby maintaining a constant torque output by the internal combustion engine;
    comparing an actual change of the second actuating variable resulting from the closed loop control scheme to an expected change in the second actuating variable according to the closed loop control scheme, based on the implemented change in the first actuating variable, to determine a deviation between the actual change and the expected change; and
    evaluating an operating condition of the pressure sensor based on the determined deviation.

11. The computer program product as claimed in claim 10, wherein the non-transitory machine-readable data carrier includes a semiconductor memory selected from the group consisting of: a ROM, a PROM, an EPROM, an EEPROM, and Flash EPROM.

12. The computer program product as claimed in claim 10, wherein the first actuating variable comprises a pressure in the fuel accumulator device.

13. The computer program product as claimed in claim 12, wherein the pressure in the fuel accumulator device is changed linearly.

14. A system for testing a pressure sensor of a fuel accumulator device of an internal combustion engine, comprising:
    a fuel accumulator wherein the pressure in the fuel accumulator device changes,
    a pressure sensor coupled with the fuel accumulator and generating a signal corresponding to a fuel pressure in the fuel accumulator device; and
    a diagnostic device configured to implement the steps of:
      implementing a change in a first actuating variable;
      applying a closed loop control scheme to vary a second actuating variable in response to the change in the first actuating variable, thereby maintaining a constant torque output by the internal combustion engine;
      comparing an actual change of the second actuating variable resulting from the closed loop control scheme to an expected change in the second actuating variable according to the closed loop control scheme, based on the implemented change in the first actuating variable, to determine a deviation between the actual change and the expected change; and
      evaluating an operating condition of the pressure sensor based on the determined deviation.

15. The system according to claim 14, wherein the torque generated by the internal combustion engine is determined by means of a torque detection facility.

16. The system according to claim 14, wherein the second actuating variable is selected from at least one of: an injection duration, an injection time, an ignition time, and a throttle valve position.

17. The system according to claim 14, wherein the first actuating variable comprises a pressure in the fuel accumulator device.

18. The system according to claim 17, wherein the pressure in the fuel accumulator device is changed linearly.

* * * * *